United States Patent
Yu et al.

(10) Patent No.: US 6,953,026 B2
(45) Date of Patent: Oct. 11, 2005

(54) PRESSURE REGULATING VALVE FOR AUTOMOTIVE FUEL SYSTEM

(75) Inventors: DeQuan Yu, Ann Arbor, MI (US); Stephen T. Kempfer, Canton, MI (US); Marc Possley, Dexter, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 25 days.

(21) Appl. No.: 10/687,137

(22) Filed: Oct. 16, 2003

(65) Prior Publication Data

US 2005/0081830 A1 Apr. 21, 2005

(51) Int. Cl.$^7$ .......................... F02M 37/04; F16K 31/18
(52) U.S. Cl. ....................................... 123/510; 137/450
(58) Field of Search ......................... 123/510–511, 457; 137/450, 452

(56) References Cited

U.S. PATENT DOCUMENTS

| | | |
|---|---|---|
| 121,659 A | 12/1871 | Prescott |
| 1,676,666 A | 7/1928 | Pivoto |
| 1,767,538 A | 6/1930 | Mahan |
| 2,479,620 A * | 8/1949 | Ingham, Jr. .................. 137/523 |
| 2,660,246 A | 11/1953 | Otis et al. |
| 2,909,192 A | 10/1959 | Dobrick |
| 4,964,391 A | 10/1990 | Hoover |
| 5,050,636 A * | 9/1991 | Sagawa et al. ............. 137/494 |
| 5,560,343 A | 10/1996 | Werkmann et al. |
| 5,623,910 A | 4/1997 | Riggle |
| 5,639,229 A | 6/1997 | Cooke |
| 5,669,356 A | 9/1997 | Wall et al. |
| 5,692,479 A | 12/1997 | Ford et al. |
| 5,842,455 A | 12/1998 | Tuckey et al. |
| 6,109,243 A | 8/2000 | Seyerle |
| 6,152,171 A | 11/2000 | Messick et al. |
| 6,253,740 B1 | 7/2001 | Rembold |
| 6,497,247 B1 | 12/2002 | Kinoshita et al. |
| 6,520,163 B2 | 2/2003 | Yoshioka et al. |
| 6,532,941 B2 | 3/2003 | Begley et al. |
| 2001/0025639 A1 | 10/2001 | Kiowsky et al. |
| 2002/0026927 A1 | 3/2002 | Yoshioka et al. |
| 2002/0096147 A1 | 7/2002 | Muhlhausen |

* cited by examiner

Primary Examiner—Thomas Moulis
(74) Attorney, Agent, or Firm—Brinks Hofer Gilson & Lione

(57) ABSTRACT

A pressure regulated valve is provided for a mechanical returnless fuel system for an automotive vehicle that includes a fuel pump for supplying fuel from a fuel supply to an engine. The pressure regulating valve includes a conduit in fluid communication with the pump outlet. The valve includes a valve seat and a valve body having a frustoconical seal surface. A spring biases the valve body to close the valve body against the valve seat. During operation, increased fuel pressure from the pump opens the valve body to discharge excess fuel to the fuel supply.

12 Claims, 2 Drawing Sheets

PRESSURE REGULATING VALVE FOR AUTOMOTIVE FUEL SYSTEM

TECHNICAL FIELD OF THE INVENTION

This invention relates to a pressure regulating valve for a mechanical returnless fuel system for an automotive vehicle. More particularly, this invention relates to such pressure regulating valve comprises a spring-biased frustoconical valve body.

BACKGROUND OF THE INVENTION

In a modern automotive vehicle, the engine is equipped with fuel injectors that spray precise quantities of fuel into the air stream flowing through a manifold to the combustion chambers. The fuel is distributed to the injectors through a fuel rail mounted on the engine. A computer controller calculates the precise quantity of fuel and the opening time required by the fuel injector to release the precise quantity. The opening time is dependent upon the pressure drop across the injector, which is in part determined by the fuel pressure within the fuel rail.

Mechanical returnless fuel systems are known for supplying fuel from a fuel tank to the fuel rail. A typical system comprises a fuel pump located within the fuel tank and connected to the fuel rail through a fuel line. Conventional mechanical returnless fuel systems seek to maintain a constant fuel pressure within the fuel rail and the fuel line. This is accomplished by a pressure regulator that is coupled to the fuel line and opens to discharge fuel to the fuel supply to thereby relieve excess pressure within the fuel line. Conventional fuel systems utilize a pressure regulator that comprises a diaphragm that opens to relieve the pressure. Such diaphragm-type regulators are effective to maintain substantially constant fuel pressure, but add significantly to the cost of the system.

The fuel system also typically includes one or more valves that include a spring-biased ball or the like and that are less expensive. Such ball valves open in response to fuel pressure, but tends to result in variations in opening pressure or pulsations in fuel line pressure. Thus, ball valves are suited for use as pressure relief valves or check valves where pressure variations do not adversely affect performance. For example, it is known that fuel line pressure increases during hot soak following hot engine operation and necessitates a pressure relief valve. However, ball valves are not suited for use to regulate pressure in a predictable manner that is required for precise engine control. As used herein, a distinction is made between a pressure relief valve that opens to relieve a significant overpressure greater than the desired operating pressure, and a pressure relief valve regulating fuel pressure at a desired operating valve. Fuel systems, referred to as electronic returnless fuel systems, have been developed that include spring-biased ball valves for pressure relief, but utilize pressure sensors and electronic controls to regulate fuel pump duty cycle to maintain a desired operating pressure.

Therefore, there exists a need for a pressure regulating valve for a automotive fuel system that opens to recycle excess fuel and produces a predetermined fuel pressure within the fuel line that is reliable for precise engine control, and that is less costly, particularly when compared to diaphragm-type pressure regulators.

SUMMARY OF THE INVENTION

In accordance with this invention, a pressure regulating valve is provided for a mechanical returnless fuel system for an automotive vehicle that includes a fuel pump having a pump outlet for supplying fuel from a fuel supply to an engine. The pressure regulating valve comprises a conduit in fluid communication with the pump outlet and adapted for recycling fuel to the fuel supply. A valve seat is disposed within the conduit. The valve also includes a valve body received in the conduit and having a frustoconical seal surface. The valve body is movable along an axis between a closed position wherein the frustoconical seal surface engages the valve seat and an open position wherein the valve body is spaced apart from the valve seat to permit fuel flow through the conduit. A spring biases the valve body in the closed position. During closing, the frustoconical valve body reliably positions against the valve seat and forms a substantially linear seal, thereby minimizing variations in the opening pressure. Moreover, when open, the gap through which fuel flows between the valve seat and the frustoconical valve body is determined by the spring constants of the spring and tends to be linear. As a result, fuel pressure is readily predictable by the computer controller for purposes of precise engine control. Thus, the pressure regulating valve in accordance with this invention provides a simple construction that may be readily manufactured at reduced cost and is suitable for regulating fuel line pressure in an automotive fuel system.

BRIEF DESCRIPTION OF THE DRAWINGS

This invention will be further illustrated with reference to the accompanying drawings wherein.

DETAILED DESCRIPTION OF THE INVENTION

Figure 1:
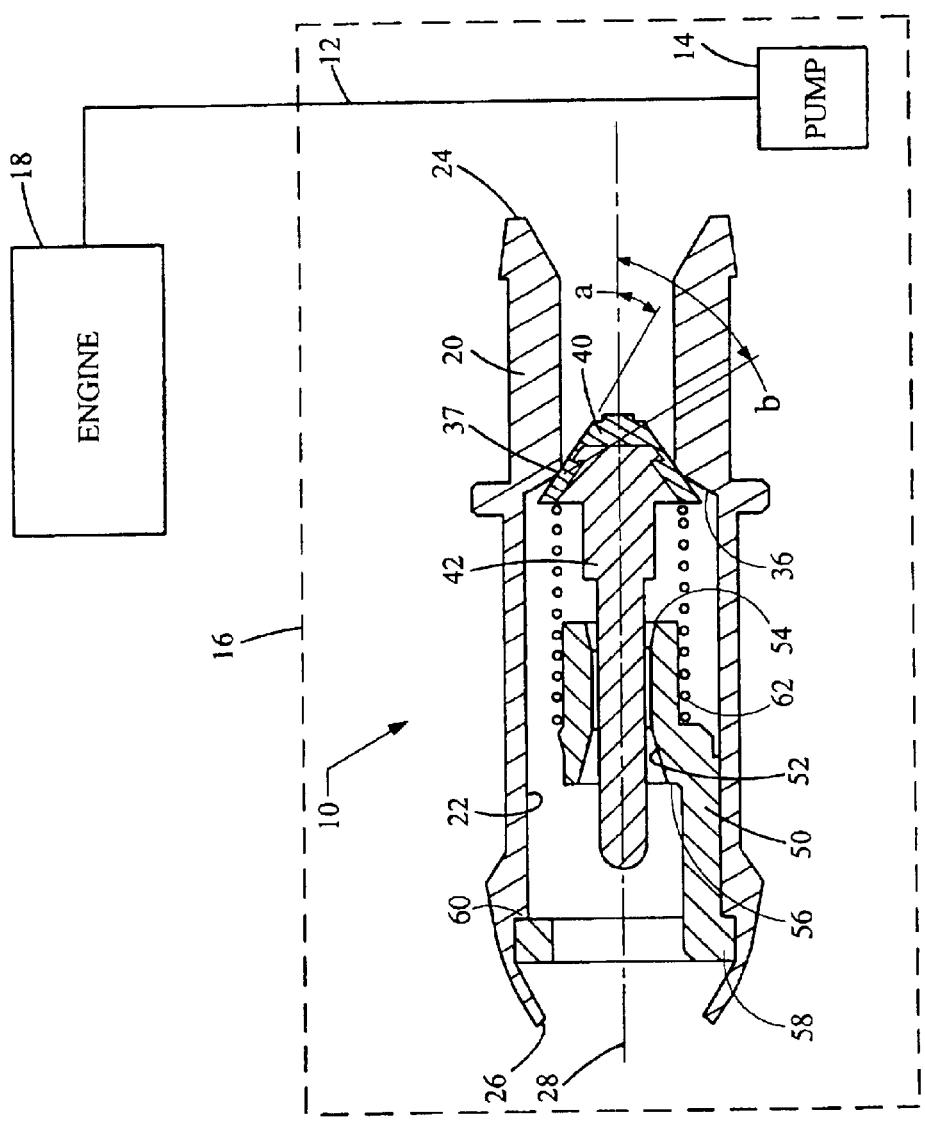
FIG. 1 is a cross sectional view of a pressure relief valve in a closed position in accordance with the preferred embodiment of this invention.
Figure 2:
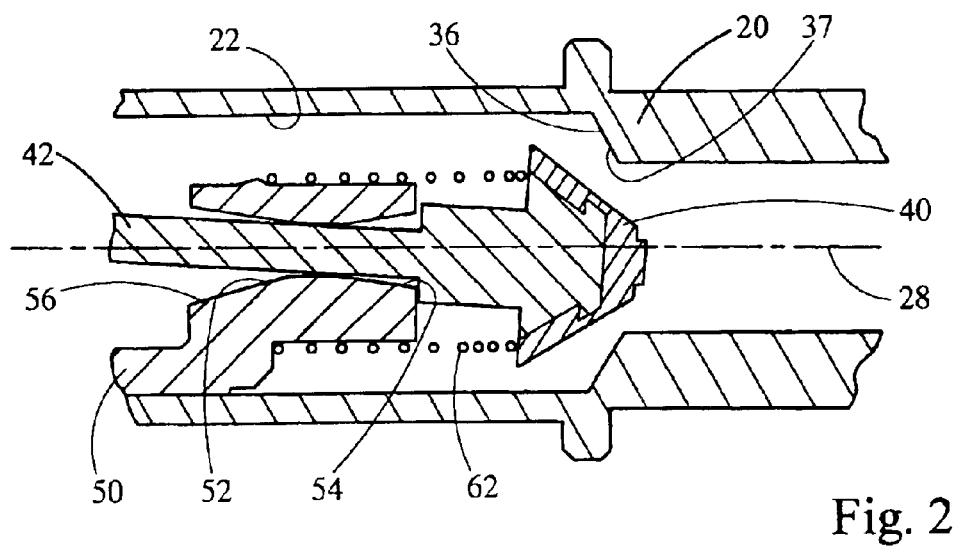
FIG. 2 is a cross sectional view of the pressure regulating valve in FIG. 1 in an open position.

In accordance with a preferred embodiment of this invention, referring to FIGS. 1 and 2, a pressure regulated valve 10 is adapted for use in a mechanical returnless fuel system for an automotive vehicle. The fuel system preferably includes a fuel line 12 connecting a pump outlet of a fuel pump 14 located within a fuel tank 16 to a fuel rail mounted on the engine 18. Valve 10 comprises a housing 20 that defines a conduit 22 that extends between an inlet 24 and an outlet 26. The valve is mounted so that inlet 24 is in fluid communication with the outlet of pump 14 and outlet 26 discharges fuel to the fuel supply within tank 16. Inlet 24 is suitably coupled to fuel line 12 using a T fitting. Alternately, valve 10 may be incorporated into pump 14 so that housing 20 forms a portion of the pump structure.

Within housing 20, the valve elements are arranged to open and close along an axis 28. Housing 20 includes a valve seat 36 circumferentially about conduit 22 and includes an inboard edge 37. In the preferred embodiment, the valve seat 36 is beveled to provide a frustoconical surface.

Valve 10 further comprises a valve body 36 that is mounted on a valve stem 42. A valve guide 50 is disposed within housing 20 and defines a axial bore 52 in which valve stem 42 is received. Bore 52 comprises a constricted midsection and provides clearance adjacent upstream and downstream ends 54 and 56, respectively, to allow valve stem 42 to tilt relative to axis 28, as described herein. Valve guide 50 includes a retaining ring 58 that is positioned against a shoulder 60 in housing 20 adjacent outlet 26 and secured by crimping. A coil spring 62 interposed between valve body 36 and guide 50 biases valve body 40 against valve seat 36 in the closed position depicted in FIG. 1.

During operation, fuel is pumped from fuel pump 14 to engine 18 through fuel line 12. A computer controller regulates the duty cycle of the fuel pump based upon projected engine fuel demand. When the fuel pump output exceeds the actual fuel demand, the excess fuel increases fuel pressure within the fuel line. In response to the increased fuel pressure, pressure regulating valve 10 moves from the closed position in FIG. 1 to the open position in FIG. 2 and recycles a portion of the pressurized fuel to the fuel supply within fuel tank 16. Valve body 40 features a frustoconical sealing surface that extends at a first angle a relative to axis 28. Valve seat preferably has a frustoconical shape that intersects axis 28 at an angle b that is greater than angle a. As a result, when valve 10 closes, valve body 40 engages valve seat 36 at inboard edge 37. This results in near linear contact in contrast to seals having surface-to-surface contact over a relatively large area, provides more consistent seating of the valve body and a more consistent opening pressure.

In response to increased fuel pressure within fuel line 12, valve stem 42 slides axially to space valve body 40 apart from valve seat 36 and thereby provide a gap for fluid flow through conduit 22 to relieve excess pressure. It is also an advantage that the valve seat is able to tilt relative to axis 28 in the open position. This is attributed to the clearance provided within the valve guide bore 52 about the valve stem 42. The constricted midsection of the guide bore and the frustoconical shape of valve body 40 provide coaxial centering of the valve body 40 in the closed position, which also contributes in maintaining a consistent opening pressure. After opening, the valve stem is permitted to tilt relative to axis 28 in the tilted orientation shown in FIG. 2. This tilting provides a relatively large region for fuel flow, in contrast to a uniform circumferential gap formed by axial displacement alone. The tilted position reduces pressure pulsation within fuel line 12 that would otherwise result from vibration of the valve body within the pressurized fluid flow. The orientation of the valve body in the tiled position also reduces the ratio of the length to the cross sectional flow area about valve body 40 and thereby reduces the pressure drop across the valve, to further reduce pressure pulsation. This provides a more uniform fuel flow through conduit 22 and a more constant pressure within the fuel line.

Figure 3:
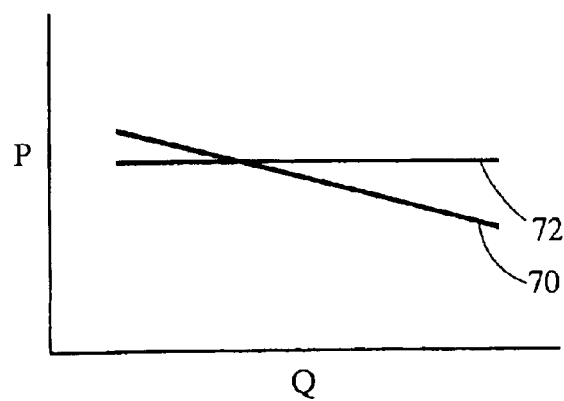
FIG. 3 is a graph showing engine fuel flow as a function of fuel pressure in a fuel line equipped with a pressure regulating valve in accordance with this invention.

Referring now to FIG. 3, there is depicted a graph showing engine fuel flow rate to the engine as a function of fuel line pressure P for a pressure regulating valve in accordance with this invention. The engine fuel flow rate is equal to the output of fuel pump 14 minus the quantity of recycled fuel by pressure regulating valve 10. Line 70 shows a substantially linear relationship between engine fuel flow rate and fuel pressure P for pressure regulating valve. For purposes of comparison, curve 72 represents an idealized situation that provides a substantially constant pressure that is independent of fuel flow, such as is desired for a diaphragm-type pressure regulator. Based upon the force characteristics of the coil spring that biases the valve body, the pressure P may increase slightly with increased flow rates. In general, an engine control system of an automotive engine equipped with a mechanical returnless fuel system also preferably includes an oxygen sensor or the like for detecting stoichiometry of the exhaust gas and providing a feedback signal to an engine controller that adjusts the opening time of the injectors to increase or decrease the quantity of fuel to achieve a desired near-stochiometric condition. In this manner, it is believed that the computer controller may adjust the opening timing to compensate for the slight increase in fuel line pressure associated with pressure regulating valve 10. It is believed that pressure regulating valve 10 contains the pressure within acceptable limits for use with conventional engine control systems. Alternately, since the pressure regulating valve achieves a predetermined relationship between the engine fuel flow rate and the fuel line pressure, the computer controller may estimate the fuel rail pressure based upon predicted engine fuel demand, for example, using a lookup table, and use the estimated fuel rail pressure to determine the pressure drop across the injectors for purposes of calculating a more precise injector opening time.

Therefore, this invention provides a pressure regulating valve that includes relatively few components and is readily manufactured with reduced cost, particularly in comparison to conventional diaphragm-type pressure regulators. The simple construction of the pressure regulating valve includes a valve body that has a frustoconical sealing surface and is biased by a coil spring. The frustoconical valve body exhibits a self-centering feature during closure that assures a more consistent opening pressure. Because of the assured seating, it is not necessary to restrict the valve stem to axial movement and indeed, in the preferred embodiment, clearance is provided to permit lateral displacement of the valve element to reduce pressure pulsation due to vibration of the valve element. As a result, the valve is capable of regulating fuel pressure in a consistent and predetermined manner that can be used by the computer controller in calculating injector opening time.

While this invention has been disclosed in terms of certain embodiments thereof, it is not intended to be so limited, but rather only to the extent set forth in the claims that follow.

What is claimed is:

1. A pressure regulating valve for a mechanical returnless fuel system for an automotive vehicle comprising a fuel pump having a pump outlet for supplying fuel from a fuel supply to an engine, said pressure regulating valve comprising:

a conduit having an inlet in fluid communication with the pump outlet and connecting to said fuel supply;

a valve seat disposed within the conduit;

a valve body received in the conduit and comprising a frustoconical seal surface, said valve body being moveable along an axis between a closed position wherein the frustoconical seal surface engages the valve seat and an open position wherein the valve body is spaced apart from the valve seat to permit fuel flow through the conduit; and a spring for biasing the valve in the closed position; and wherein the frustoconical seal surface of the valve body extends at a first angle relative to the axis, and said valve seat is frustoconical and extends at a second angle relative to the axis that is distinct from the first angle.

2. The pressure regulating valve of claim 1 further comprising a valve guide disposed within the conduit and defining a bore, and a valve stem attached to said valve body and received in the bore.

3. The pressure regulating valve of claim 1 wherein the first angle is less than the second angle.

4. A pressure regulating valve for a mechanical returnless fuel system for an automotive vehicle comprising a fuel pump having a pump outlet for supplying fuel from a fuel supply to an engine, said pressure regulating valve comprising:

a housing defining a conduit having an inlet in fluid communication with the pump outlet and an outlet for discharging fuel to said fuel supply;

a valve guide disposed within the conduit, a valve seat disposed within the conduit and having an inboard edge;

a valve body received in the conduit and comprising a frustoconical seal surface, said valve body being moveable along an axis between a closed position wherein the frustoconical seal surfaces engages the inboard edge of the valve seat and an open position wherein the valve body is spaced apart from the valve seat to permit fuel flow through the conduit;

a valve stem attached to the valve body opposite the frustoconical seal surface and received within the valve guide, and a spring intermediate the valve body and the valve guide for biasing the valve in the closed position; and wherein the valve guide includes an axial bore wherein the valve stem is received, said bore having constricted midsection.

5. The pressure regulating valve of claim 4 wherein the axial bore includes ends that are sized to provide clearance for the valve stem to permit the valve stem in the open position to tilt relative to the axis.

6. The pressure regulating valve of claim 4 wherein the inlet is coupled to a fuel line connecting the fuel pump to the engine.

7. The pressure regulating valve of claim 4 wherein the pressure regulating valve is incorporated within the fuel pump.

8. A mechanical returnless fuel system for an automotive vehicle for supplying fuel from a fuel supply to an engine, said mechanical returnless fuel system comprising:

a fuel pump having a pump outlet;

a fuel line connecting the pump outlet to the engine; and a pressure regulating valve comprising:

a conduit having an inlet in fluid communication with the pump outlet and connecting to said fuel supply;

a valve seat disposed within the conduit;

a valve body received in the conduit and comprising a frustoconical seal surface, said valve body being moveable along an axis between a closed position wherein the frustoconical seal surface engages the valve seat and an open position wherein the valve body is spaced apart from the valve seat to permit fuel flow through the conduit; and a spring for biasing the valve in the closed position; and wherein the frustoconical seal surface of the valve body extends at a first angle relative to the axis, and said valve seat is frustoconical and extends at a second angle relative to the axis that is distinct from the first angle.

9. The mechanical returnless fuel system of claim 8 further comprising a valve guide disposed within the conduit and defining a bore, and a valve stem attached to said valve body and received in the bore.

10. The mechanical returnless fuel system of claim 8 wherein the first angle is less than the second angle.

11. The mechanical returnless fuel system of claim 9 wherein the bore has constricted midsection.

12. A mechanical returnless fuel system for an automotive vehicle for supplying fuel from a fuel supply to an engine, said mechanical returnless fuel system comprising:

a fuel pump having a pump outlet;

a fuel line connecting the pump outlet to the engine; and a pressure regulating valve comprising:

a conduit having an inlet in fluid communication with the pump outlet and connecting to said fuel supply;

a valve seat disposed within the conduit;

a valve body received in the conduit and comprising a frustoconical seal surface, said valve body being moveable along an axis between a closed position wherein the frustoconical seal surface engages the valve seat and an open position wherein the valve body is spaced apart from the valve seat to permit fuel flow through the conduit;

a spring for biasing the valve in the closed position;

a valve guide disposed within the conduit and defining a bore, and a valve stem attached to said valve body and received in the bore; and wherein the bore has constricted midsection; and further wherein the axial bore includes ends that are sized to provide clearance for the valve stem to permit the valve stem in the open position to tilt relative to the axis.

\* \* \* \* \*